A. H. MILLER.
GRAIN SEPARATOR.
APPLICATION FILED JULY 11, 1921.
1,390,806.
Patented Sept. 13, 1921.
2 SHEETS—SHEET 1.
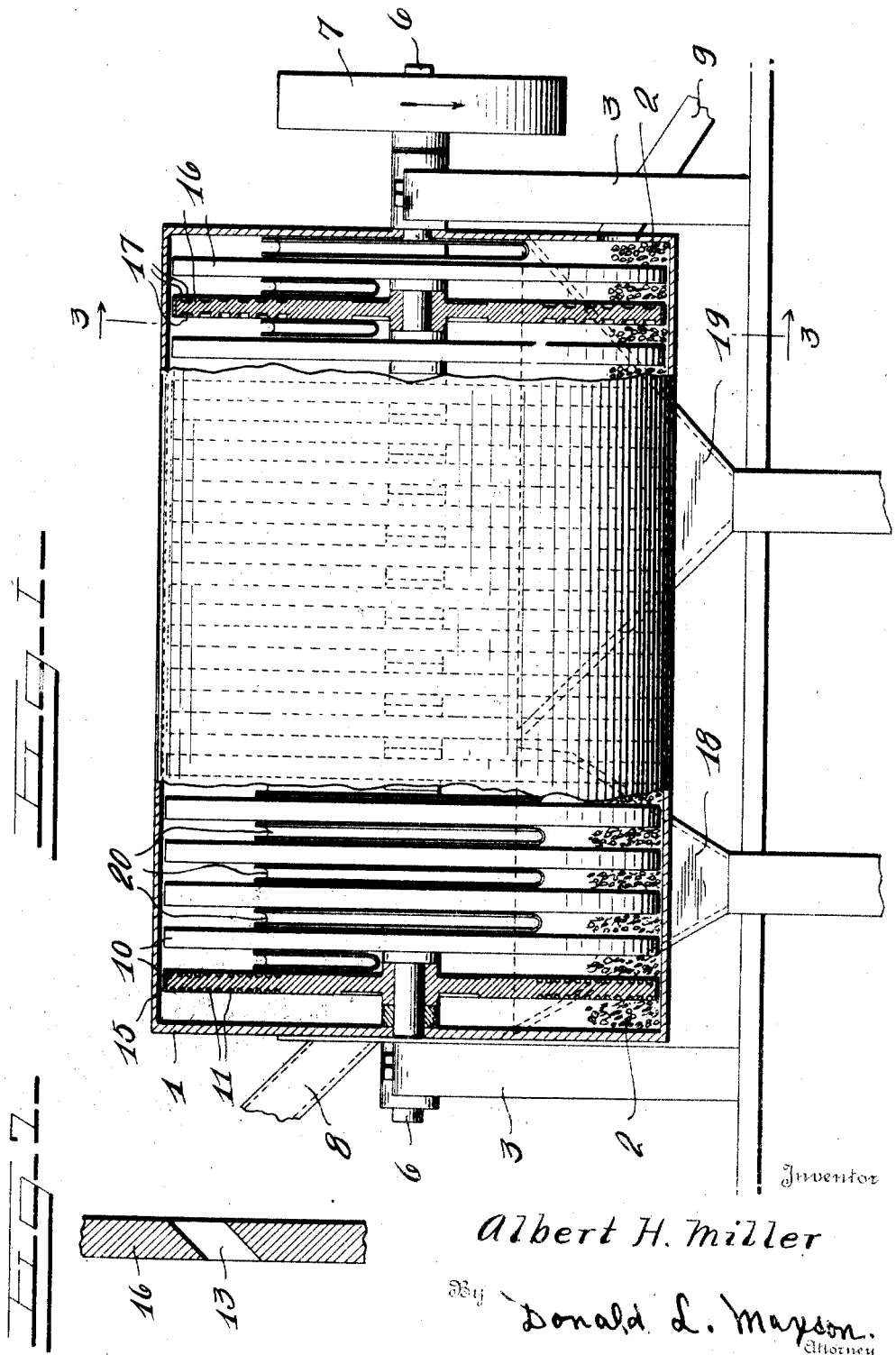
Inventor
Albert H. Miller
By Donald L. Mayson
Attorney A. H. MILLER.
GRAIN SEPARATOR.
APPLICATION FILED JULY 11, 1921.
1,390,806.
Patented Sept. 13, 1921.
2 SHEETS—SHEET 2.
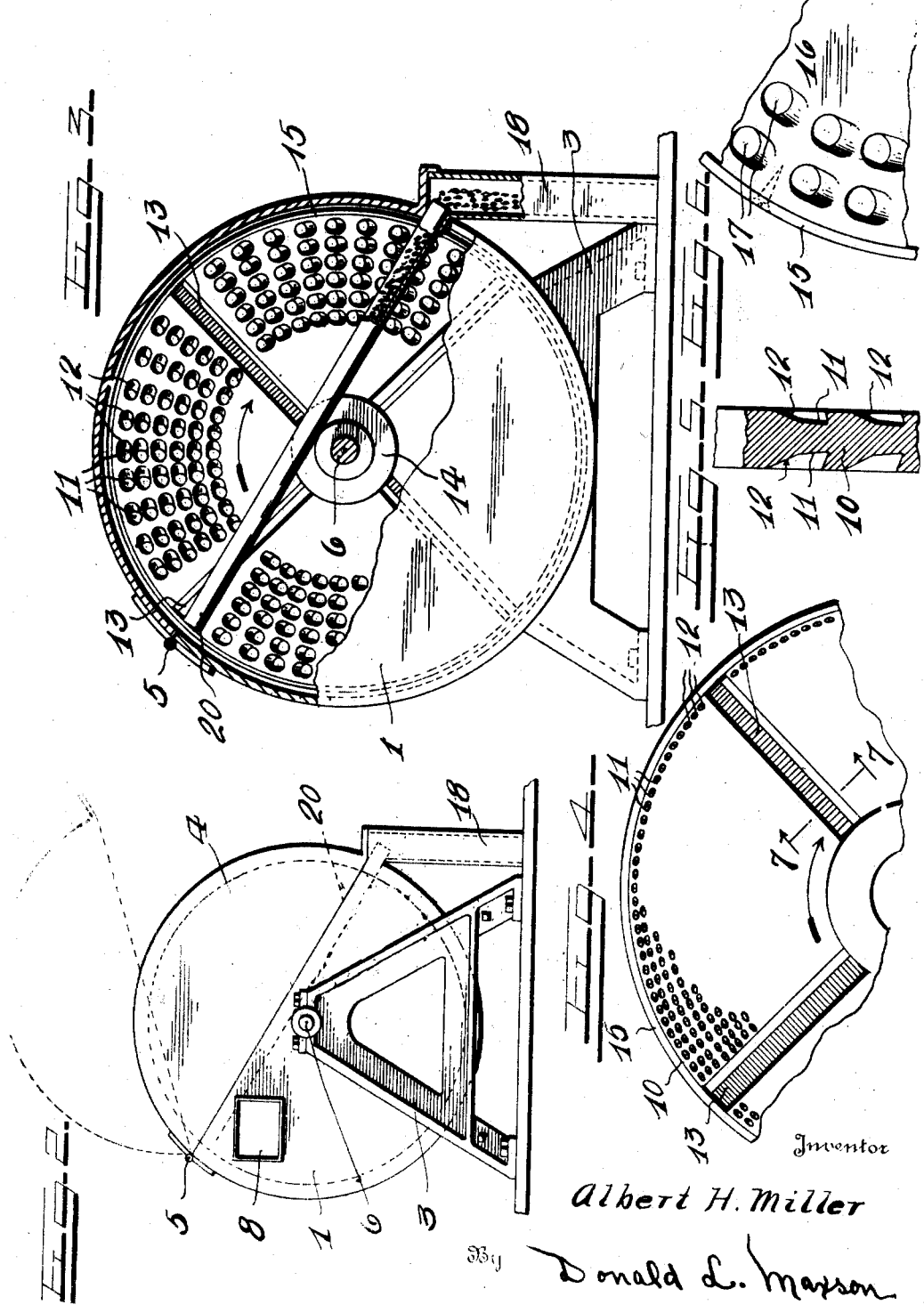
Inventor
Albert H. Miller
By Donald L. Mayson
Attorney

UNITED STATES PATENT OFFICE.

ALBERT H. MILLER, OF MILTONA, MINNESOTA.

GRAIN-SEPARATOR.

1,390,806.  Specification of Letters Patent.  Patented Sept. 13, 1921.

Application filed July 11, 1921. Serial No. 483,937.

*To all whom it may concern:*

Be it known that ALBERT H. MILLER, a citizen of the United States, residing at Miltona, in the county of Douglas and State of Minnesota, has invented certain new and useful Improvements in Grain-Separators, of which the following is a specification.

This invention relates to improvements in grain separators and more particularly to that type of separator known as the disk type separator, in which the desired grain is separated from the garlic and pea seeds, and other undesirable materials or seeds.

An object of the invention is to provide a suitable grain separator, which will successfully separate the wheat grains or the oat grains from the smaller seeds which get mixed therewith during the harvesting of the grain.

Another object is to provide a grain separator which will be provided with a plurality of disks having small pockets in their opposite faces, and also a plurality of other disks, being provided with larger pockets in their faces, whereby the smaller undesirable seeds will be separated first, and then the desired seeds or grains will be separated and collected.

A further object of my invention is to provide a suitable grain separator, which will be efficient in use, and inexpensive to manufacture.

Other objects will appear as the description proceeds.

In the accompanying drawings which constitute a part of my application,

Figure 1 is a side elevation of my separator, shown partly in section;

Fig. 2 is an end elevation of the separator;

Fig. 3 is a sectional view taken on the line 3—3 of Fig. 1;

Fig. 4 is a side elevation of a portion of one of the separator disks having the smaller pockets for separating the pea seeds, etc.;

Fig. 5 is a detail section showing the construction of the recesses or pockets;

Fig. 6 is a detail side elevation showing the construction of the recesses of pockets in the disks, and Fig. 7 is a sectional view taken on the line 7—7 of Fig. 4.

Like characters of reference are used throughout the several pages of specification to designate corresponding parts.

The container 1 for the grain 2 is cylindrical in shape, and extends in a horizontal plane, being mounted in the end bracket members 3. The top portion 4 of the container 1, is hinged at 5, so that ready access may be had to the interior to make adjustments if necessary.

A shaft 6 is mounted between the bracket members 3, and extends through the container 1, and is provided with a pulley 7 at one of its ends, to which a source of power may be connected to operate the separator.

Positioned at one end of the container 1, is the inlet or feed chute 8, where the grain as harvested is let into the separator, and likewise at the opposite end of the separator is a discharge chute 9, through which passes the larger grain, as for example the oat grains.

At the end adjacent the inlet chute 8, are mounted a plurality of separator disks of such type to separate out the small seeds like buckwheat, pidgeon grass, etc. These disks 10, are mounted on the shaft 6, and are integral in construction. A plurality of recesses or pockets 11 are formed in each face of the disk 10, said pockets being round in shape and having a portion thereof beveled off or slanting, as at 12, so that the grain may the more easily slide therefrom at the proper time. The openings of the pockets 11 are all formed in the same direction, so that when the disks are rotated, the grain will be picked up, and deposited when they have passed the center line of travel.

As before mentioned, these disks 10 are integral in construction, and are provided with a plurality of radially extending slots 13, which extend through the disk at an angle of approximately 45 degrees. These slots 13 extend from the center of the disk, to the periphery thereof. Reinforcing disks 14 are attached to each side of the wheels or disks at their center, and an annular reinforcing strip 15 may or may not be attached to the periphery of the disk, as desired.

Positioned on the shaft 6, between the disks 10 and the opposite end of the container 1, are a plurality of disks 16, exactly like the disks 10, but provided with cylindrical recesses or pockets 17 one side of each recess being inclined or beveled which are considerably larger in size. These disks 16, separate out the wheat from the other seeds or grain, and will permit the grain or seeds of still larger size to pass on and out of the discharge chute 9.

The function of the radially extending slots 13, is to push or feed the grain along the inside of the container 1, when the separator is in operation. The grain being fed into the inlet end will be pushed along until it reaches the discharge end, but in the meantime, the small seeds and wheat will have been separated therefrom and collected.

Positioned at the front of the separator, are the two spout hoppers 18 and 19, for the collection of the small seeds and grains of wheat respectively. The spouts 20, are positioned between each one of the disks 10 and 16, and are adapted to catch the seeds or grain as it is discharged from the pockets or recesses in the several disks. Thus it will be led into the spout hoppers and into a suitable receptacle. The spouts 20 extend on an incline from the rear to the front of the container 1, so that the different seeds or grains will fall at a point adjacent their lower portions or extremities.

The operation of the separator is as follows: The different grains and seeds as harvested will be fed into the inlet chute 8, and pass into the container 1. The disks on the shaft 6. will be rotated at a speed of approximately 40 to 45 revolutions per minute. The disks provided with the smaller pockets will pick up the smaller seeds like buckwheat, and deposit them into the chutes or spouts 20, where they will pass into the hopper 18, there to be collected. The rotation of the disks will cause the remainder of the grain to be worked or pushed toward the opposite end of the container, at which time it comes in contact with the disks 16, which pick up the wheat, and deposit it in the spouts and into the hopper 19. The larger seeds or grains like oats, etc., will finally be discharged out of the chute 9, thereby completing a threefold separation.

It will be found that this separator when run at the correct speed will be highly efficient, and will positively not clog, due to the positioning of the spouts 20, and the functioning of the radially disposed slots 13.

It will be understood that many minor changes in detail of construction may be resorted to without departure from the spirit of the invention.

Having thus described my invention what I claim as new and desire to secure by Letters Patent of the United States is:—

1. A grain separator comprising a container for the grain, a shaft extending therethrough, and having an inlet at one end of said container, and an outlet at its opposite end, a plurality of disks mounted on said shaft, said disks being provided with a plurality of cylindrical recesses or pockets, each pocket having an inclined side, the disks adjacent the inlet end of the container being provided with smaller pockets than those adjacent the outlet end of the container.

2. A grain separator comprising a container for the grain to be separated, a shaft extending therethrough, and having an inlet at one end of said container, and an outlet or discharge at its opposite end, a plurality of integrally formed disks carried by said shaft, said disks being provided with a plurality of cylindrical recesses or pockets each pocket having an inclined side in their opposite faces, the disks adjacent the inlet being provided with smaller pockets than those adjacent the discharge, substantially as described.

3. A grain separator comprising a container for the grain to be separated, a shaft extending therethrough, and having an inlet at one end of said container, and outlet or discharge at its opposite end, a plurality of integrally formed disks carried by said shaft, said disks being provided with a plurality of cylindrical recesses or pockets each pocket having an inclined side in their opposite faces, the disks adjacent the inlet end being provided with smaller pockets than those adjacent the outlet, and means for progressively advancing the grain from the inlet end toward the outlet end.

4. A grain separator comprising a container for the grain to be separated, a shaft rotatably mounted therethrough, and having an inlet at one end of said container, an outlet at its opposite end, a plurality of integrally formed disks carried by said shaft, said disks being provided with a plurality of cylindrical recesses or pockets, closed at their inner ends, and having a portion of their outer ends beveled off to form discharge portions, the disks adjacent the inlet end of the container being provided with smaller pockets than those adjacent the outlet end, a plurality of chutes positioned between said disks, and a plurality of chute hoppers for the collection of the different kinds of seed or grains.

5. A grain separator comprising a container for the grain to be separated, a shaft extending therethrough, an inlet and outlet formed at opposite ends of said container, a plurality of disks on said shaft, said disks being provided with a plurality of recesses or pockets in their opposite faces, said disks being provided with a plurality of radially disposed slots, whereby the grain will be progressively advanced from the inlet toward the outlet, substantially as described.

6. A grain separator comprising a container for the grain to be separated, a revolubly mounted shaft extending therethrough, said container having an inlet and an outlet at opposite ends thereof, a plurality of disks carried by said shaft, said disks being provided with a plurality of recesses or pockets in their opposite faces, the disks adjacent the inlet end of the container being provided with smaller pockets than those adjacent the outlet chute, each of said disks being provided with a plurality of radially disposed slots, whereby the grain will be progressively advanced from the inlet end to the outlet.

7. A grain separator comprising a container for the grain to be separated, a revolubly mounted shaft extending therethrough, an inlet and outlet at opposite ends thereof, a plurality of disks carried by said shafts, a plurality of chutes positioned between said disks and extending substantially diametrically across the disks, a hopper adjacent the inlet end of said container for the small grains, and a hopper at the opposite end thereof for the wheat, means comprising a group of disks with small pockets, and other disks with larger pockets for separating the several types of grain, all of said disks being provided with a plurality of radially disposed slots for progressively advancing the grain from the inlet toward the discharge end of the container.

8. A grain separator comprising a container for the grain to be separated, a shaft extending therethrough, a plurality of disks carried by said shaft, said disks being provided with a plurality of pockets in their opposite faces, said disks also being provided with radially disposed slots for progressively advancing the grain from the inlet end to the outlet, and the disks adjacent the inlet end being provided with smaller pockets than those adjacent the outlet end, substantially as described.

9. A grain separator comprising a receptacle, a plurality of disks rotatably mounted therein, said disks being provided with pockets in their opposite faces, said disks being further provided with radially extending slots for progressively advancing the grain from the inlet to the outlet end of the receptacle, reinforcing bands around the periphery of said disks, the disks adjacent the inlet being provided with smaller pockets than the disks adjacent the outlet, and a plurality of hoppers for collecting the grains of different sizes.

In testimony whereof I affix my signature.

ALBERT H. MILLER.